Patented Feb. 11, 1930

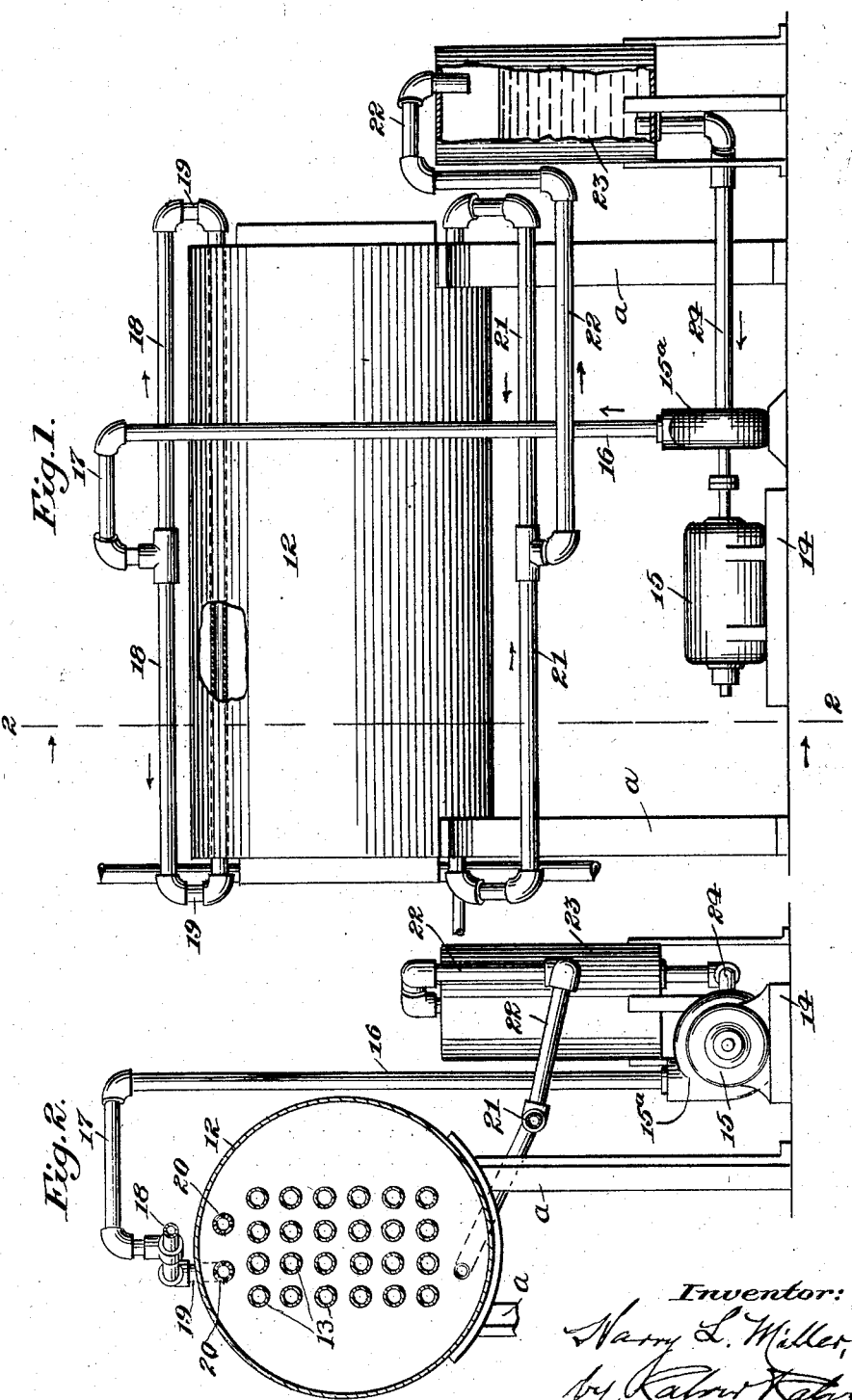

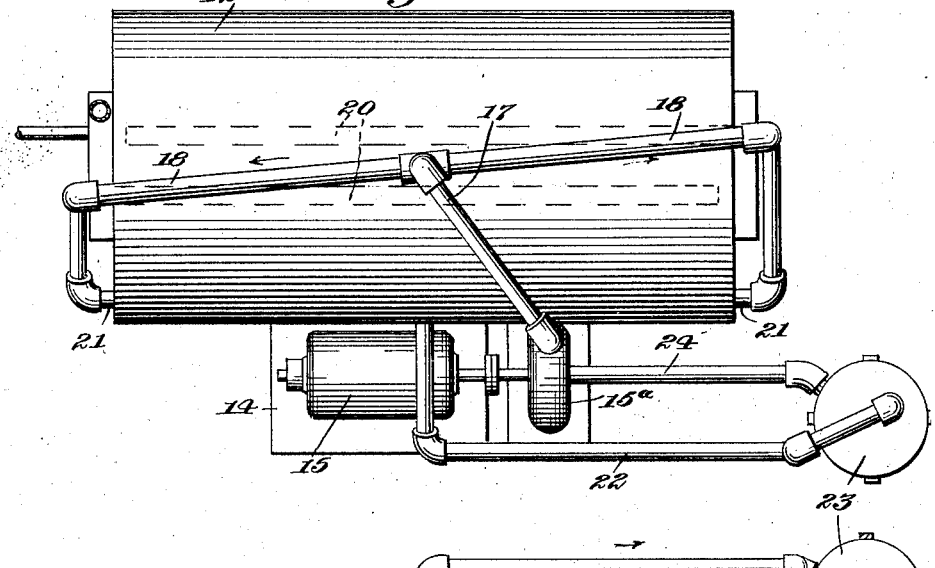
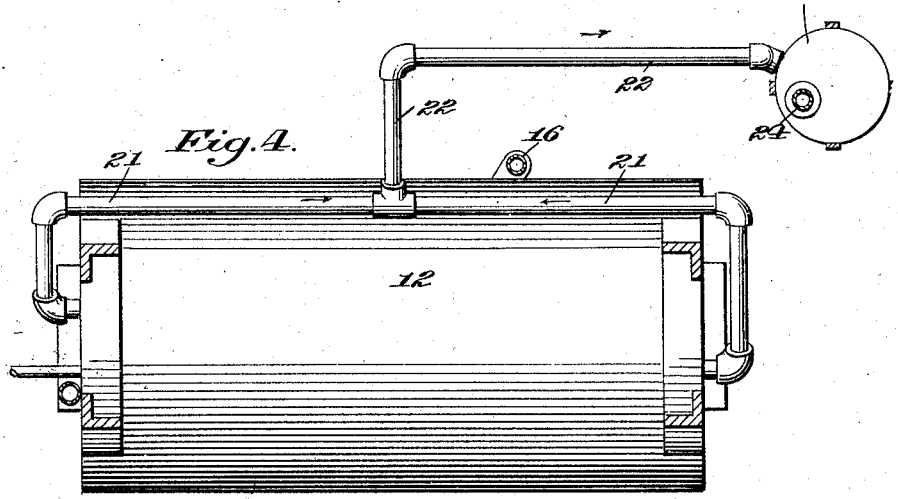

1,746,438

UNITED STATES PATENT OFFICE

HARRY L. MILLER, OF SWARTHMORE, PENNSYLVANIA

CIRCULATION SYSTEM FOR BARREL HEATERS

Application filed December 12, 1927. Serial No. 239,552.

This invention relates to what are known as "barrel" heaters, working on the general principle of that shown in the U. S. Patent to Rein and Bromall, No. 1,031,732, July 9, 1912, and the invention has for its object to provide a better circulation of the heating fluid than is now obtained by the constructions generally in use. In these barrel heaters the liquid to be heated is circulated back and forth through longitudinal tubes suitably mounted within the chambers of a barrel-like tanks, and the heating liquid which surrounds the said tubes is circulated through the said chambers. The liquid in the chambers of the tanks or barrels is heated by steam which condenses in the water or other heating fluid employed in the device, but in these heaters which have generally been in use a satisfactory circulation of the heating liquid has not been obtained, nor has proper provision been made for taking care of the increased volume of the heating fluid due to condensation of steam.

In the operation of these barrel heaters, as now generally in use for pasteurizing milk, the admission of steam to the chambers of the heaters, in which the circulation tubes for the milk are arranged, is controlled by diaphragm valves connected with the milk outlet pipes so that when the temperature of the milk in the outlet pipes gets above any desired point the steam is automatically shut off; and when the temperature in the milk outlet pipes drops to a certain point the diaphragm valves are opened for the inlet of steam. There has, however, been a difficulty encountered in controlling these heaters in that there is a space of time between the periods when the valves either open or close, and frequently the temperature gets too high before the valves are closed or too low before they are opened. This is due to the fact that there is no mechanical circulation of water within the heaters themselves except that which is induced by the steam which is being injected into the water in the chamber of the barrel heaters. This invention has for its object to obviate this difficulty and provide a construction which will insure a proper circulation of the heating water or other fluid.

In the accompanying drawings, which are somewhat diagrammatic, Fig. 1 is an elevation illustrating the present invention; and Fig. 2 is a transverse section through the tank or barrel, on line 2—2, Fig. 1. Fig. 3 is a plan view looking down on Fig. 1, and Fig. 4 is a bottom view, looking up on Fig. 1, showing the arrangement of discharge or outlet pipes.

Referring to the drawings, 12 denotes the tank of a barrel heater within which are suitably mounted a series of tubes 13 through which the liquid to be heated is circulated back and forth, from the bottom of the tank or barrel upward, the tubes being connected in pairs at their ends by suitable passages so that the liquid to be heated passing through one tube will be caused to enter an adjoining tube for circulation in the opposite direction, after the principle of the apparatus shown in the Rein and Bromall patent hereinbefore referred to. As the general construction which permits the circulation of the liquid to be heated through the tubes 13 forms no part of the present invention it is not necessary to illustrate this well known old construction or feature, the present invention relating to means for circulating the water or other liquid which surrounds the tubes in the chamber of the tank or barrel 12 through which the liquid to be heated passes in said tubes. The tank or barrel 12 is, in practice, mounted on a suitable frame-work the legs $a$ of which are shown as being partly broken away.

Supported on a suitable base 14 is a motor 15 which drives a rotary pump in the housing 15ᵃ the chamber of which communicates with a pipe 16 extending upward outside of the tank or barrel 12 and which pipe 16 communicates with the middle part of a horizontal pipe 18 above the tank or barrel 12 and through which pipe the liquid flowing from the pump is caused to flow in opposite directions so that it will pass through return bends 19 into perforated pipes 20 within the chamber of the tank or barrel 12 and thus be properly distributed in said chamber as it is discharged from said pipes 20.

The water or other liquid in the chamber of the tank or barrel is discharged from said chamber through pipes 21 opening into the ends of the lower part of the said tank or barrel at opposite sides of the latter, as more clearly shown in Fig. 4, and through which pipes 21 the liquid flows in opposite directions to an outlet pipe 22 which discharges into an expansion or return supply tank 23 located above the level of the circulating pump and from which tank 23 it flows by gravity through a pipe 24 to pump at 15ª and then to the return pipe 16 through which it is forced by the circulating pump into the top of the tank or barrel through the pipes 17, 18, 19 and 20 hereinbefore referred to.

It will be understood that by virtue of the circulating pump at 15ª, the pipe connections shown, and the expansion or return supply tank 23, the heating liquid will be in continuous circulation through the chamber of the tank or barrel 12, said expansion or return supply tank taking care of the increased volume of the heating liquid due to condensation of the heating steam employed.

Having thus described my invention I claim and desire to secure by Letters Patent:

1. The combination with a tank or barrel, adapted to contain a heating liquid, and a series of heating tubes mounted in the chamber of said tank or barrel and through which tubes the liquid to be heated is caused to circulate back and forth, of a circulating pump for forcing the heating liquid into the chamber of said tank or barrel, circulation pipes outside of said tank or barrel connecting said pump with the chamber of said tank or barrel, said circulating pipes comprising a horizontal pipe above said tank or barrel, and a vertical pipe extending upward from said pump and connected to the middle part of said horizontal pipe, so that the liquid will flow in opposite directions in said horizontal pipe, perforated pipes arranged in the upper part of said chamber and communicating with said circulation pipes, outlet pipes communicating with the lower part of said chamber, and an expansion or return tank arranged above the level of said circulating pump and into which return tank said outlet pipes discharge, and from which the discharged liquid will flow by gravity to said pump.

2. The combination with a tank or barrel, adapted to contain a heating liquid, and a series of heating tubes mounted in the chamber of said tank or barrel and through which tubes the liquid to be heated or cooled is caused to circulate back and forth, of a circulating pump for forcing the heating liquid into the chamber of said tank or barrel, circulation pipes outside of said tank or barrel connecting said pump with the chamber of said tank or barrel, perforated pipes arranged in the upper part of said chamber and communicating with said outside circulation pipes, said outside circulation pipes comprising connections enabling them to discharge into said perforated pipes at opposite ends of said tank or barrel, outlet pipes communicating with the lower part of said chamber, and an expansion or return tank arranged above the level of said circulating pump and into which return tank said outlet pipes discharge, and from which the discharged liquid will flow by gravity to said pump.

In testimony whereof I affix my signature.

HARRY L. MILLER.